Patented June 16, 1931

1,810,487

UNITED STATES PATENT OFFICE

CLARENCE W. LAWR, OF PACHUCA, HIDALGO, MEXICO

RECOVERY OF CYANID FROM ALKALIN LIQUORS

No Drawing.   Application filed December 14, 1928.  Serial No. 326,159.

This invention relates to the recovery of cyanid from alkalin solutions thereof, and it has particular reference to a method of recovering cyanid in a form suitable for use anew by purifying and stabilizing the liquor with the controlled addition of acid, and thereafter recovering the purified liquor.

In the metallurgical arts the disposition of weak or exhausted cyanid solutions resulting from the treatment of ores is a technical problem. For many years it has been the usual practice, in treating auriferous or argentiferous ores for the recovery of gold, silver, and other values, to leach the ore with a dilute solution of an alkalin cyanid, such for example, as a solution of potassium, sodium, or calcium cyanid. The leach liquor is then treated for the removal of its precious metal contents. Ordinarily the pregnant liquor agitated with zinc dust is pumped through filter presses or the pregnant solution is passed through boxes containing zinc shavings. In this treatment the gold and silver and other metals more electropositive than zinc are precipitated while the latter goes into solution.

More recently, the cyanid extraction process has been proposed for use in connection with the treatment of ores other than gold and silver, specifically, copper and mercury. Where the precious metal contents of such ores are small in comparison with the base metal contents the loss of the latter in the cyanid solution represents a large money value. The base metals dissolved in the cyanid solution usually represent considerable value, where recoverable, and the cyanid combined with these metals is often so great that its value, when not liberated from the base metals and recovered constitutes a loss greater than the value of the gold and silver recovered. Under such conditions the ore in question could not be treated at a profit; whereas, if the base metals were recovered, as well as the cyanid combined with them, such an ore could be commercially utilized.

Owing to the losses of base metals, as well as of cyanid, when treating impure gold or silver ores, considerable attention has been directed to the problem of recovering these values. Each mine or working, of course, presents local problems, but in a general way, it may be said that the cyanid liquors obtained after leaching the ore and removing the richer values, contain essentially, cyanid (CN or Cy.) combined with alkali (potassium and sodium, etc.) and also some other metallic cyanids, such as silver and copper cyanids. These various cyanids exist in complex relationships, the nature of which need not be herein further set forth for a full understanding of the instant invention. It is sufficient to note that they do exist, without speculation upon the various matters of theory offered in explanation thereof.

The cyanids are salts of hydrocyanic acid (prussic acid) and are extremely poisonous. Hydrocyanic acid, itself, (HCN) is a deadly poison, reacting with water through hydrolysis to form other nitrogenous compounds, such as urea, with the partial liberation of cyanogen $(CN)_2$. The hydrolysis persists even when the solution is made alkalin and, in practice, it is customary to add an excess of alkali, usually in the form of lime, to reduce this source of loss to a minimum.

In treating ores containing sulfids there are also formed sulphocyanates, which also represent a source of loss. Metals, likewise, combine with the dissolved cyanid existing in the leaching liquid, and, unless these metals are recovered or their combinations with cyanid broken down, such combinations also represent a loss of cyanid from the process. Another loss occurs through the customary process of filtering the pulp obtained in treating the ore. The wet pulp (filter cake) contains some cyanid and unless extensive washing is resorted to this retained fraction of the solution is also lost. In practice, it is not feasible to wash the filter cake to too great an extent since the washings must, to be saved, enter the milling solution circuit and the latter must be maintained more or less constant in volume, which would be impossible with unlimited washing.

According to this invention, there is provided a process for recovering cyanid from liquors, such as those just referred to, with economies in operations and the avoidance of much of the loss enumerated. Particularly, the invention looks to a process wherein the alkalin cyanid liquors are so treated as to permit of the quick elimination of substantially all of the lime (present in the solution as hydrate or cyanid) after which the solution is readily processed for the removal of its metallic and cyanid contents.

In one way of treating such liquors heretofore proposed the solution was treated with sulfuric acid to neutralize the solution. With such treatment, the complex alkalin metallic cyanids were said to be converted into simple cyanids, thereby liberating in the solution one half of the cyanid so combined. The half quantity of cyanid was then recovered by separating the precipitate of metallic cyanid from the liquor, and then adding an excess of lime to the residual solution to precipitate the sulfate as calcium sulfate, providing thereby an alkalin cyanid solution for use in treating fresh quantities of ore. This process is obviously not sufficiently far reaching for modern practice, since only one half of the available cyanid is recovered, and such small, but valuable amounts of metals as are retained in the solution, are not recovered.

In another way of working, the alkalin cyanid solutions have been treated with an excess of acid, such as sulfurous acid, by means of which the lime present is partly precipitated as calcium sulfite and the resulting unstable acid solution is then treated with air, with or without heat, or the like, to drive off the cyanid as hydrocyanic acid or cyanogen for absorption in an alkalin medium. The addition of excess acid has, however, the disadvantageous effects of re-dissolving some of the precipitate of calcium sulfite, and necessitating the use of excessive amounts of acid. It is necessary in practice to employ extensive apparatus, and to guard carefully against the escape of poisonous hydrogen cyanid or cyanogen vapors into the surrounding atmosphere.

In driving off the unstable cyanid from such acidified solutions, there is invariably formed a new precipitate of calcium sulfite which deposits as a hard scale in the solution pipe lines, dispersing tanks, filters, etc., thereby increasing maintenance costs. An excessive amount of $SO_2$ is also required in order to reduce clogging of the apparatus with lime sulfite in such cases. In such highly acid solutions containing re-dissolved calcium sulfite and metallic sulphocyanates there is invariably a loss of silver and copper in the precipitated calcium sulfite formed. The addition of acid to such solutions as contain retained calcium salts is, of course, also excessive and uneconomical, as these salts react with the acid, thereby consuming more than that required for the simple liberation of the cyanid, and increasing the ratio of total acidity to the $SO_2$ ion. Further sources of loss in the excess acid process of recovery need not be enumerated here.

According to this invention, the complex cyanids are broken up with recovery of cyanid, and the lime is precipitated by the addition of a controlled amount of acid, usually sulfur dioxid gas (when this gas is dissolved in water it is known as sulfurous acid), or sulfuric acid. A sufficient amount of acid is added to bring the alkalin liquor to substantial neutrality against phenolphthalein. While this is the optimum operating condition, it will of course be understood that the solution after treatment with acid may still be slightly acid or slightly alkalin within the spirit of the invention. Neutrality is advantageous, however, as I have found that in such substantially neutral liquors there is a maximum or complete precipitation of calcium hydrate, (and a partial precipitation of the lime present as chlorid) as calcium sulfite, and the resulting solution is so stable as regards the free escape of cyanogen as to permit of easy and safe handling. As previously noted, the addition of either insufficient, or excess acid results in either the incomplete precipitation of the calcium, or in its redissolution, and hence by treating the liquor with just enough acid to render it neutral the maximum amount of calcium is precipitated without concurrent formation of excess sulfites in the liquor, which would react subsequently with further consumption of acid, and also cause sulfite reprecipitation in the dispersion units.

The addition of the acid to neutralize the solution is advantageously spread over a period of time, and the $SO_2$ gas is brought into contact with the solution in such a way that local excesses are avoided. In one way of operating, the alkalin cyanid liquor is sprayed through the top of a long covered wooden box, while the $SO_2$ gas is bubbled up through the pool of solution that collects on the bottom on its passage through the box. The neutralized solution is then run into settling or thickening tanks of such size as to permit of the retention of the liquor therein from two to four hours. Two such tanks connected in series may be employed. In these tanks the calcium sulfite settles in a readily separable granular form, and it may be removed as a sludge from the bottom from time to time or pumped out continuously, while the stable neutral solution may be removed from the settling tanks by providing a simple overflow, thus employing a process of decantation; or the neutral liquor may be filtered to free it from any suspended precipitates that may be carried over with the overflowing solution.

The stable solution of cyanid is thus freed from its lime content before acidification proper, and hence, the difficulties heretofore experienced in the gradual re-precipitation of lime during and following the acidification, in the conveying pipes and dispersion apparatus, will not be encountered. The purified solution, free from lime and containing available cyanid in stable form, and also silver and copper and other values, is then conducted into acidifying apparatus wherein controlled additional quantities of $SO_2$, or other acid, are introduced to liberate the cyanid from the solution as hydrocyanic acid or cyanogen, and also to condition the solution for removal of recoverable metallic values.

It has been discovered that a somewhat critical relationship exists between the $SO_2$ acid ion content of the bath and the total acidity, favorable to the maximum recovery of cyanid and the recoverable metallic contents remaining therein. Depending upon the specific composition of the liquor undergoing treatment, therefore, the amount of acid employed in the second phase of addition is so controlled or adjusted as to favor the liberation of the cyanid combined with the metals, in order that it may be recovered, and further, properly to prepare the solution for the maximum recovery of the gold, silver, copper, and other metals.

Proper conditions obtain when the solution is acid; but of low total acidity, and with a low ratio of total acidity to acid ion concentration. That is, the best results obtain when the total acidity is due to free $SO_2$ alone. This optimum can be practically realized only in the absence of lime. As previously noted, due to the substantially complete removal of lime in the first step of acid addition to neutrality to phenolphthalein, a loss of $SO_2$ by recombination with the lime is not here experienced. Accordingly, when sulfurous acid is employed, only a slight excess of $SO_2$ need be introduced in the second phase of the process to produce a definite acidity in the liquor undergoing treatment. Such acidity is best measured against methyl orange as an indicator instead of phenolphthalein, as in the previous case. In the presence of sufficient free $SO_2$ and soluble sulphocyanates, the silver and copper present in the solution are completely precipitated as insoluble sulphocyanates, providing that enough of the cyanid in the solution has been driven off. The precipitated metals can be settled out as a sludge, or filtered. The cyanid with which these metals were originally combined is retained in the solution for recovery later, or simultaneously with the precipitation of the metals.

The step of adding more $SO_2$ to unstabilize the neutral liquor and so render the contained cyanid available for removal may hereinafter be referred to as acidification, while the operation of actually removing the cyanid in the form of a gas for subsequent absorption in an alkalin solution may be referred to as the dispersion of the solution. The dispersion is effected by adding to the neutral solution, from which the lime has been removed in the manner previously outlined, enough $SO_2$ to provide the stated ratio of total acidity to free $SO_2$ ion, then placing this properly acidified solution under partial vacuum or passing large volumes of low pressure air through it, when the cyanid is decomposed and goes off as gas and is passed through an alkalin absorbing solution which fixes the gas as a stable alkalin cyanid.

The absolute ratio of total acidity to free $SO_2$ ion will vary with the composition of the liquor being dispersed, but a low total acidity with high free $SO_2$ acidity represents the desired condition. The acidity indicates a condition under which complex cyanids will be broken down so as to liberate cyanid in a gaseous form. However, too high an acidity tends to retard the speed of the dispersion reaction itself, besides neutralizing a larger quantity of alkali in the absorbing solution, thus reducing the efficiency of the latter as an absorbent. With poor absorption the air circulating in the dispersion-absorption system becomes overloaded with circulating cyanogen or HCN and the dispersion then falls off badly. That is, poor absorption causes poor dispersion and consequently, low cyanid recoveries. Low total acidity with high free $SO_2$ ion content are the conditions sought, in that these conditions will give the highest dispersion and absorption efficiencies and the greatest recoveries of silver, copper, and cyanid; and such conditions can only be realized where the acid solution being dispersed is free from lime sulfites and bisulfites.

Due to the previous elimination of the lime hydrate, the ratio of total acidity to free $SO_2$ ion is easily maintained at the proper point. The nearer this ratio approaches unity—with the total acidity kept to the minimum consistent with maximum dispersion—the more nearly the conditions of acidity approach the ideal for the best results. Under such conditions, there is obtained an increased yield of cyanid and metallic values with a lower consumption of $SO_2$. The conditions for the maximum dispersion and the recovery of the cyanid are hence obtainable when working in this way, or stating the matter in other language: a greater recovery of cyanid; less total cyanid loss; less acid consumption; less corrosive action on the apparatus (due to low acidities); less maintenance cost to keep the plant free from lime sulfite deposits; and a reduction of loss in residual metal recovery, are provided by the present procedure.

The slightly acid solution, from which the lime was removed by a preliminary neutralization with $SO_2$, containing unstable cyanid, may be dispersed at normal temperatures or it may, before entering the first disperser, be heated from say, 80° F., or lower, to 110° F. This increase in temperature is desirable as the hydrogen cyanid and cyanogen is evolved practically twice as fast at 110° F. as at 80° F. When treating solutions free from lime, as are here obtained, the liquor may be heated by steam coils passing into the apparatus, or by any other suitable means. This is not feasible when the solution contains lime as the latter would form a hard scale on the coils or other heating elements, thus preventing efficient heat transfer. Many installations using a cyanid recovery process need operate in cold climates where the application of heat to the acid solution previous to dispersion is essential to economic success, and for such installations, the present process is particularly adapted.

In working up the metallic precipitates obtained after final acidification and dispersion, to recover silver, copper, etc., the precipitates may be filtered to remove as much of the solution as possible from them. The filtrate may then be discarded, or used as a filter wash, either with or without previous treatment with quick lime to remove the zinc as hydrate which may be recovered.

Where the lime is not removed from the solution to be dispersed, by a preliminary neutralization with $SO_2$ as described in this application, the filtration of the dispersed solution for the removal of the metallic precipitates encounters difficulties in that the lime gradually crystallizes out in the pores of the canvas filter leaf and even on the inner side of the leaf. The deposit of sulfite so formed is difficult to remove, especially when the lime sulfite becomes mixed with more or less of the copper and silver sulphocyanates being filtered. Such deposits cut down the porosity of the filter leaf which necessitates considerable labor and expense for muriatic acid in order to keep the filter leaves up to their highest efficiency. In the present process of preliminary elimination of the lime in the acidifier feed no such clogging or choking up of filter leaves with calcium sulfite can take place, because the amount of calcium sulfite dissolved in the liquor is too small to be thrown out of solution due to a decrease in solution acidity or a partial evaporation. With no lime deposits forming on the filter leaves much expense is saved in labor and materials for acid treating the leaves and for occasionally replacing them completely with new ones.

While the invention herein disclosed has been described with particular relation to its application to liquids obtained in the cyanid treatment of gold and silver ores, it will be understood that it is not so limited, but that it may be applied to a variety of solutions.

I claim:

1. A method of recovering silver, copper, and other values from alkalin cyanid liquors obtained by leaching gold-silver ores containing copper, which comprises separating the gold and silver from the pregnant solution, treating the residual liquor with sulfur dioxid to neutralize the same, separating the resulting solution from the precipitates so formed, adding additional quantities of sulfur dioxid to precipitate the copper and any residual silver values, and to provide sufficient total acidity and free $SO_2$ to liberate hydrogen cyanid.

2. A method of recovering cyanogens from alkalin solutions of cyanides containing a soluble alkalin earth salt, which comprises neutralizing the solution with an acid capable of forming an insoluble precipitate of the alkalin earth, removing the precipitate, adding an excess of acid to the solution and blowing it with air to remove the free HCN.

3. A method of recovering cynaogens from alkalin solutions of cyanides containing a soluble alkalin earth salt, which comprises neutralizing the solution with a material containing an acid ion capable of forming an insoluble precipitate of alkalin earth, removing the precipitate, adding an excess of acid ion containing material and blowing it with air to remove free cyanogens.

4. A method of recovering cyanogens from alkalin solutions of cyanides containing a soluble calcium salt, which comprises neutralizing the solution with the addition of sulfur dioxid to form a precipitate of calcium sulphite, removing the precipitate, and then adding an excess of sulfur dioxid to the solution, and blowing the latter with air to remove free cyanogens.

In witness whereof, I have hereunto signed my name.

CLARENCE W. LAWR.